S. B. WILLIAMS.

PLOW ATTACHMENT.

No. 10,719. Reissued May 4, 1886.

WITNESSES

Villette Anderson.

Philip C. Masi.

INVENTOR

S. B. Williams by Anderson & Smith his ATTORNEYS

N. PETERS, Photo-Lithographer, Washington, D. C.

UNITED STATES PATENT OFFICE.

SAMUEL B. WILLIAMS, OF SAILORS REST, TENNESSEE.

PLOW ATTACHMENT.

SPECIFICATION forming part of Reissued Letters Patent No. 10,719, dated May 4, 1886.

Original No. 288,904, dated November 20, 1883. Application for reissue filed November 20, 1885. Serial No. 183,460.

*To all whom it may concern:*

Be it known that I, SAMUEL B. WILLIAMS, of Sailors Rest, in the county of Montgomery and State of Tennessee, have invented certain new and useful Improvements in Plow Attachments; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

Figure 1:
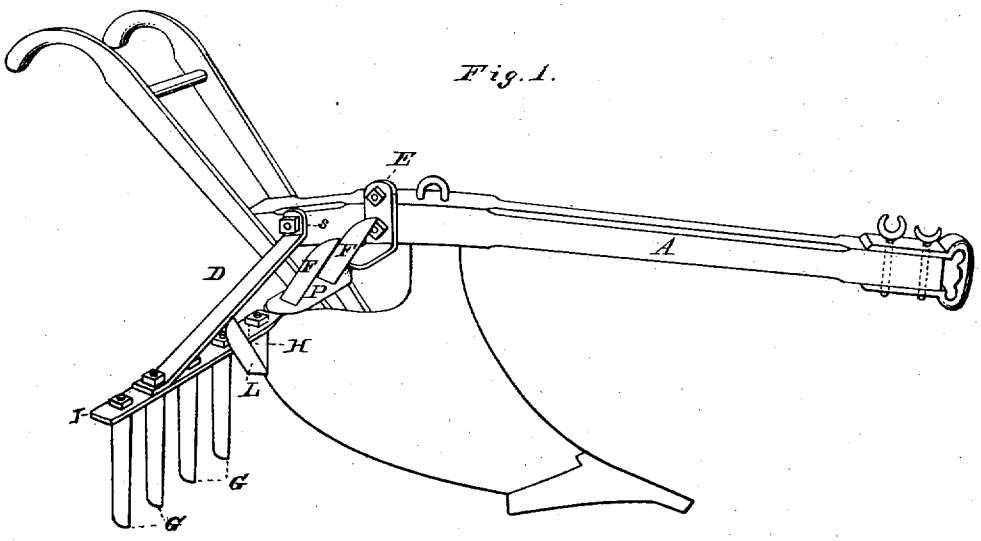
Figure 2:
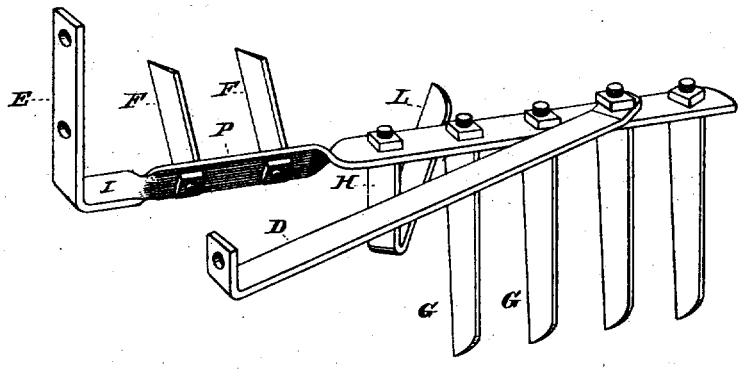

Figure 1 of the drawings is a perspective view of a plow with my attachment, and Fig. 2 is a perspective view of my attachment.

This invention relates to improvements in plows; and it consists in the construction and novel combination of parts, as will be hereinafter fully described, and particularly pointed out in the claims.

The invention has for its object to provide a cheap and simple means whereby the furrow-slice, as it leaves the mold-board of any ordinary plow, may be cut and pulverized, evenly distributing the earth along the path of the plow as it is driven across a field, thus gaining the twofold advantage of a plow and a harrow.

Referring by letter to the drawings, I designates a flat bar of metal which is provided with a suitable number of perforations for the reception of the teeth or cutters G. These cutters are shown four in number, but may be of any number desired, according to the size of the plow to which they are applied and the length of the said bar. In the inner perforation of the flat portion of this bar is also secured an angular knife cutter, the shank of which, as shown at H, extends downward parallel with relation to the teeth G, and terminates in an upwardly-oblique cutting-blade, L, the object of which will be hereinafter explained.

The bar I is provided at its inner end with a vertical arm, E, which is arranged relatively at right angles to the outer straight portion, as shown, and is provided with perforations or other suitable means whereby the said bar may be secured to the plow-beam near the bisection of the handles. The bar I is provided between the outer flat portion and inner rectangular arm, E, with a portion, P, which is also provided with oblique upward teeth or cutters F. These teeth in operation are designed to slightly overhang the mold-board of the plow, and first strike the furrow-slice, which is afterward thrown in contact with the angular cutter or breaking-knife L, and finally with the downwardly-extending teeth or pulverizing-cutters G.

D indicates a brace-arm, one end of which is provided with a perforation, which may be placed over any of the upper threaded ends of the vertical cutters and secured thereto by means of a nut, as shown. The opposite end of this brace is provided with a rectangular arm, *s*, which is also perforated, whereby it may be secured to the plow-beam.

The attachment when secured to a plow assumes a rearward oblique or diagonal position with relation to the plow-beam, the angular cutter and cutters F being in rear of the mold-board.

Having thus described my invention, what I claim, and desire to secure by Letters Patent, is—

1. In a clod-cutting-plow attachment, the angular knife having a downwardly-extending shank, H, and an upward oblique blade, L, substantially as specified.

2. In a clod-cutting-plow attachment, the combination, with the angular oblique cutter or breaking-knife H L, of the downwardly-extending pulverizing-knives G, substantially as specified.

3. In a clod-cutting-plow attachment, the combination, with the angular oblique cutter or breaking-knife H L, of the upward oblique cutting-knives F and the downwardly-extending pulverizing-knives G, substantially as specified.

4. In a clod-cutting-plow attachment, the combination, with the angular oblique cutter or breaking-knife H L, of the upward oblique cutters F, substantially as specified.

5. The combination, with the plow-beam, of the bar I, having the clamping portion, the brace D, the oblique upper knives, F, the downward-projecting knives G, and the angular knife or breaking-cutter H L, substantially as specified.

6. The combination, with the plow-beam A, of the bar I, having the right-angled clamping portion E, the brace D, the oblique upper knives, F, the downward-projecting knives G, and the angular knife H, all arranged substantially as shown and described.

In testimony whereof I affix my signature in presence of two witnesses.

SAMUEL B. WILLIAMS.

Witnesses:
G. HOLLEMAN,
C. H. BAILEY.